Patented May 7, 1940

2,199,403

UNITED STATES PATENT OFFICE 2,199,403

SULPHATES OF UNSATURATED ALCOHOLS

Clyde Overbeck Henke, Wilmington, Del., and Frank McGrew Schofield, Woodstown, N. J., assignors to E. I. du Pont de Nemours & Company, Wilmington, Del., a corporation of Delaware No Drawing. Application July 7, 1939, Serial No. 283,190

3 Claims. (Cl. 260—459)

This invention relates to normal, primary, unsaturated, aliphatic alcohol sulphates and more particularly to myristoleyl sodium sulphate and palmitoleyl sodium sulphate, which products are particularly valuable surface active agents and textile assistants.

This invention has as an object the preparation of new chemical compounds which are useful as surface active agents and textile assistants. A further object is to produce these new compounds by novel and easily conducted processes which give high yields of relatively high quality products. A still further object is to use these new compounds in various technical processes wherein capillary active compounds are commonly employed. Other objects will appear hereinafter.

In carrying out the objects of this invention we fractionally distill under reduced pressure a mixture of normal primary, saturated and unsaturated, aliphatic alcohols containing principally from 12 to 20 carbon atoms obtained by the sodium reduction of sperm oil to obtain cuts or mixtures of normal primary, aliphatic alcohols containing chiefly 14 or 16 carbon atoms or both. The mixture of saturated and unsaturated alcohols thus obtained is extracted with liquid sulphur dioxide in order to separate the unsaturated alcohol or alcohol mixture from the corresponding saturated alcohols. Subsequent evaporation of the liquid sulphur dioxide extract yields the crude, unsaturated alcohol or alcohol mixture. The crude product may be purified by washing with a solution of sodium chloride and then fractionally distilling under reduced pressure. The purified, unsaturated alcohol or alcohol mixture is then converted into the corresponding unsaturated alcohol sulphate by sulphation methods which do not appreciably attack the double bond in the alcohol molecule.

The following examples illustrate the invention.

Example I

A mixture of normal primary, saturated and unsaturated, aliphatic alcohols containing from 12 to 20 carbon atoms obtained by the sodium reduction of sperm oil was subjected to fractional distillation under reduced pressure. A 20% cut, obtained immediately after the first 25% cut, distilled at 185°–192° C. at 19–20 mm. This mixture of alcohols had an iodine number of 51 and an hydroxyl number of 232; the molecular weight, calculated from the hydroxyl number, was 242. The mixture of saturated and unsaturated alcohols thus obtained was extracted three times with liquid sulphur dioxide. Subsequent evaporation of the sulphur dioxide from the combined extracts yielded the crude unsaturated alcohol mixture, which was diluted with ether and washed with a saturated aqueous solution of sodium chloride. After freeing from ether and aqueous sodium chloride solution, the unsaturated alcohol mixture was distilled under reduced pressure, cutting out a small foreshot and a small residue. On redistillation, the product distilled at 140°–143° C. at 2 to 4 mm. The purified product thus obtained had an iodine number of 99.2 and an hydroxyl number of 231. The molecular weight, calculated from the hydroxyl number, was 243. These data may be compared with the following theoretical constants for palmitoleyl alcohol: iodine number 106, hydroxyl number 234, and molecular weight 240. Obviously, considering the close agreement between these two sets of figures and the narrow distillation range of the product, the unsaturated alcohol mixture isolated contained essentially pure palmitoleyl alcohol.

Palmitoleyl alcohol, isolated as described above, was converted into the corresponding unsaturated alcohol sulphate by the following procedure: 28 grams of chlorosulphonic acid (technical grade) were added dropwise to 93 grams of anhydrous pyridine at 0° to 10° C. over a period of one hour, while stirring. 50 grams of palmitoleyl alcohol, dissolved in 158 grams of anhydrous pyridine, were then added slowly to the pyridine-chlorosulphonic acid reaction mixture at 20° to 30° C. over a period of 20 minutes. After stirring the sulphation mass at 40° to 45° C. for 2 hours, it was cooled to 20° C. and subsequently converted into the corresponding sodium salt by adding 75 grams of technical, 30% aqueous caustic soda solution, while stirring and maintaining the temperature at 20° to 25° C. A sample of the neutralized mixture, dissolved in water, was slightly alkaline to phenolphthalein. The resulting palmitoleyl sodium sulphate was freed from pyridine and some water by drying in a vacuum oven at 50° to 60° C. 89 grams of palmitoleyl sodium sulphate, containing small amounts of water and inorganic salts, were thus obtained in the form of a tan-colored, waxy solid. It is believed that the major portion of the palmitoleyl sodium sulphate which is thus obtained may be represented by the following formula:

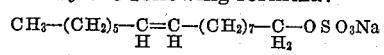

Example II

A mixture containing predominantly myristoleyl alcohol was obtained in a manner comparable with that described in Example I. The first 25% cut obtained in the fractional distillation under reduced pressure of a mixture of normal primary, saturated and unsaturated aliphatic alcohols containing from 12 to 20 carbon atoms obtained by the sodium reduction of sperm oil distilled at 130°–185° C. at 20±2 mm. This mixture of alcohols had an iodine number of 43 and an hydroxyl number of 266; the molecular weight, calculated from the hydroxyl number, was 211. In order to obtain the crude unsaturated alcohols, this first 25% cut was extracted with liquid sulphur dioxide as described in Example I. The unsaturated alcohol mixture thus obtained was fractionally distilled under reduced pressure. Of the three fractions obtained, the third and last (an 18.4% fraction) distilled at 125° to 135° C. at 3 to 4 mm. This fraction had an iodine number of 76.8 and an hydroxyl number of 267; the molecular weight, calculated from the hydroxyl number, was 210. On re-extraction with sulphur dioxide, this third fraction yielded an unsaturated alcohol mixture having an iodine number of 85.5. Myristoleyl alcohol has the following theoretical constants: iodine number 120, hydroxyl number 265, and molecular weight 212. It is apparent from these figures that the unsaturated alcohol mixture isolated consisted almost exclusively of alcohols containing 14 carbon atoms. Approximately 70% of these alcohols were unsaturated.

The above described unsaturated alcohol mixture, containing predominately myristoleyl alcohol, was converted into the corresponding unsaturated alcohol sulphate by the following procedure: 10 grams of chlorosulphonic acid (technical grade) were added dropwise to 18.6 grams of anhydrous pyridine at 0° to 10° C., while stirring. 10 grams of myristoleyl alcohol, dissolved in 31.7 g. of anhydrous pyridine, were then added slowly to the pyridine-chlorosulphonic acid reaction mixture at 20° to 30° C. After stirring the sulphation mass at 40° to 45° C. for 2 hours, it was cooled to 20° C., and subsequently converted into the corresponding sodium salt by adding 20 grams of technical, 30% aqueous caustic soda solution, while stirring and maintaining the temperature at 20° to 25° C. A sample of the neutralized mixture, dissolved in water, was slightly alkaline to phenolphthalein. The resulting myristoleyl sodium sulphate was freed from pyridine and some water by drying in a vacuum oven at 50° to 60° C. 21.7 grams of myristoleyl sodium sulphate, containing some water and inorganic salts, were thus obtained in the form of a tan-colored waxy solid. It is believed that the major portion of the myristoleyl sodium sulphate which is thus obtained may be represented by the following formula:

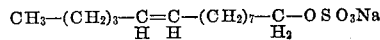

This invention contemplates the preparation of substantially pure myristoleyl sodium sulphate and palmitoleyl sodium sulphate, as well as mixtures containing predominantly either one or both of these compounds. These products may be prepared from the corresponding, normal, primary, unsaturated, aliphatic alcohols, which may be isolated from the mixture of saturated and unsaturated aliphatic alcohols obtained by the sodium reduction of sperm oil or from any other suitable source of these raw materials. The above products may be prepared by any of the sulphation methods which convert a normal, primary, unsaturated, aliphatic alcohol into the corresponding unsaturated alcohol sulphate with little or essentially no attack of the sulphating agent at unsaturated linkages. For example, the above described unsaturated alcohols may be sulphated with sodium chlorosulphonate. They may also be sulphated with the addition products obtainable from an organic base and sulphur trioxide, an organic base and sodium pyrosulphate, an organic base and chlorosulphonic acid, aliphatic ethers and chlorosulphonic acid, dioxane and sulphur trioxide, dioxane and chlorosulphonic acid, and low molecular weight aliphatic carboxylic acid esters and chlorosulphonic acid.

The intermediate alkenyl acid sulphate need not be converted into the corresponding sodium salt. Other inorganic bases and basic substances may be used instead of sodium hydroxide. Also, where the sulphation procedure employed permits it, organic bases may be used for the neutralization.

Myristoleyl sodium sulphate and palmitoleyl sodium sulphate, prepared as described above, are particularly effective wetting agents. These compounds are, respectively, 6.5 and 4.9 times as effective, as wetting agents, as oleyl sodium sulphate, prepared in a similar manner. On a 100% active ingredient basis, these three compounds effect wetting in 25 seconds at concentrations of 0.9, 1.2 and 5.9 grams per liter, respectively, when tested by the Sinking Time Method of determining relative wetting efficiencies, which is described by Draves and Clarkson in an article in American Dyestuffs Reporter beginning at page 201 in volume 20 (1931).

Myristoleyl and palmitoleyl sodium sulphates are superior to the corresponding saturated alcohol sulphates (myristyl and cetyl sodium sulphates) with respect to their greater water solubility and the ease with which they may be dissolved in water and used commercially. The products of this invention are particularly valuable technically, as they are exceptionally effective wetting agents and detergents and show good water solubility.

Resort may be had to such variations and equivalents as fall within the spirit of the invention and the scope of the appended claims.

We claim:
1. Long chain normal primary alkenyl sulphates selected from the group consisting of myristoleyl sulphate and palmitoleyl sulphate.
2. Myristoleyl sodium sulphate.
3. Palmitoleyl sodium sulphate.

CLYDE O. HENKE.
FRANK McGREW SCHOFIELD.